(12) United States Patent
Basavarajappa et al.

(10) Patent No.: US 10,554,549 B1
(45) Date of Patent: Feb. 4, 2020

(54) DCI STITCHING FOR DATA CENTER OVERLAYS

(71) Applicant: CISCO TECHNOLOGY, INC., San Jose, CA (US)

(72) Inventors: Suresh Doddagaddavalli Basavarajappa, San Jose, CA (US); Kalpesh Kirtikant Zinjuwadia, Milpitas, CA (US); Arjun Sreekantiah, San Jose, CA (US); Neeraj Malhotra, Los Gatos, CA (US); Patrice Brissette, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 255 days.

(21) Appl. No.: 15/421,268

(22) Filed: Jan. 31, 2017

Related U.S. Application Data (60) Provisional application No. 62/371,595, filed on Aug. 5, 2016.

(51) Int. Cl.
   *G06F 15/173* (2006.01)
   *H04L 12/741* (2013.01)
   *H04L 12/46* (2006.01)
   *H04L 29/08* (2006.01)
   *H04L 12/751* (2013.01)

(52) U.S. Cl.
   CPC .......... *H04L 45/74* (2013.01); *H04L 12/4641* (2013.01); *H04L 45/02* (2013.01); *H04L 69/324* (2013.01); *H04L 69/325* (2013.01)

(58) Field of Classification Search
   CPC ... H04L 45/74; H04L 12/4641; H04L 69/324; H04L 69/325; H04L 45/02
   See application file for complete search history.

(56) References Cited

U.S. PATENT DOCUMENTS

| | | | | |
|---|---|---|---|---|
| 9,385,953 B1* | 7/2016 | Hui | | H04L 45/74 |
| 9,749,336 B1* | 8/2017 | Zhang | | H04L 63/14 |
| 10,057,157 B2* | 8/2018 | Goliya | | H04L 41/12 |
| 10,079,779 B2* | 9/2018 | Zhang | | H04L 49/25 |
| 10,129,142 B2* | 11/2018 | Goliya | | H04L 45/54 |
| 10,164,881 B2* | 12/2018 | Tubaltsev | | H04L 45/74 |
| 2012/0117252 A1* | 5/2012 | Vasseur | | H04L 45/02 709/227 |
| 2014/0334286 A1* | 11/2014 | Ernstrom | | H04L 45/04 370/216 |
| 2017/0279717 A1* | 9/2017 | Bethers | | H04L 45/748 |

OTHER PUBLICATIONS

Rabadan, J., et al., "Interconnect Solution for EVPN Overlay Networks," BESS Workgroup, Jul. 7, 2016, 22 pages; https://tools.ietf.org/pdf/draft-ietf-bess-dci-evpn-overlay-03.pdf.

* cited by examiner

*Primary Examiner* — Benjamin M Thieu (57) ABSTRACT

Aspects of the embodiments are directed to methods, systems, and computer program products for stitching route targets between disparate virtual private network domains. Embodiments are directed to a datacenter interconnect (DCI) network element that is configured to receive from a first network node of a first domain a routing prefix comprising a first route target value; determine that the first route target value is associated with a first route target set, the first route target set associated with the first domain; determine a corresponding second route target set associated with a second domain; create a second routing prefix that includes one or more route target values from the second route target set; and transmit the second routing prefix to a network node in the second domain.

21 Claims, 11 Drawing Sheets

DCI STITCHING FOR DATA CENTER OVERLAYS

CROSS REFERENCE TO RELATED APPLICATIONS

This disclosure claims the benefit of priority under 35 U.S.C. § 119(e) to U.S. Provisional Application Ser. No. 62/371,595 entitled "RT COLORING METHOD TO PROVIDE DCI STITCHING FOR BGP CONTROL PLANE BASED DATA CENTER OVERLAYS," filed Aug. 5, 2016, which is hereby incorporated by reference in its entirety.

FIELD

This disclosure pertains to stitching between data center control planes and data-center-interconnect control planes.

BACKGROUND

A data center (DC) side virtual private network (e.g., Ethernet VPN-EVPN) overlay and the data center interconnect (DCI) side wide area network (WAN) (e.g., a L2VPN/L3VPN) control plane may or may not be within the same administrative domain. This implies that a single router target (RT) namespace across these multiple administrative domains cannot be guaranteed. A DC side address family may or may not be the same as a DCI side address family.

Border Gateway Protocol (BGP) is a routing protocol of the Internet that maintains a table of IP addresses (i.e., prefixes) which designate network reachability among autonomous systems (AS's). As used herein, an AS is a connected group of one or more IP prefixes run by one or more network operators which has a single and clearly defined routing policy. As used herein, the term "BGP" refers to all forms of BGP, including internal-BGP and external-BGP. Each BGP advertised route must be unique, otherwise, a subsequent advertisement of the route will consider it the same, and overwrite any previous information received about the route. BGP extensions advertise routes for a Virtual Private Network (VPN). A VPN-IPv4 address is a 12-byte string, beginning with an 8-byte Route Distinguisher (RD) and ending with a 4-byte IPv4 address. If several VPNs use the same IPv4 address prefix, these will be translated into unique VPN-IPv4 address prefixes, making it possible for BGP to carry several completely different routes to that IP address.

DETAILED DESCRIPTION

With border gateway protocol—Ethernet Virtual Private Network (BGP-EVPN) as the control plane to distribute overlay L2 and L3 reachability within a multi-tenant data center (DC), there is a need to seamlessly stitch this EVPN control plane within the data center with L3VPN and L2VPN control plane outside the data center to enable L3 and L2 data center interconnect (DCI) service for tenants.

This disclosure describes seamless control plane stitching across multiple "domains" that does not require a single route target (RT) namespace across multiple domains and does not require a single address family across multiple domains. As an example, this disclosure describes overlay control plane stitching between data-center and data-center-interconnect (DCI) domains, but can also be applied to control plane stitching applications beyond the DCI stitching application.

This disclosure describes a seamless stitching between data center control plane and data center interconnect (DCI) control plane that may not share the same RT namespace and may not use the same BGP address family. A domain scoped RT set is tagged with an indicator tag (e.g., a name of a color can represent a domain scoped RT set), and RT translation across domains is enabled via a set of RT-indicator based import and advertisement rules. As an illustrative example, this disclosure uses the names of colors as a RT-indicator, though other types of indicators are also contemplated.

This disclosure contemplates application to multiple platforms and forms the foundation for L2+L3 DCI service to be offered across multiple data center fabric solutions.

Exemplary Settings of Typical Network Environments

For purposes of illustrating the techniques proposed herein, it is important to understand the activities that may be present in a typical network environment. The following foundational information may be viewed as a basis from which the present disclosure may be properly explained. Such information is offered for purposes of explanation only and, accordingly, should not be construed in any way to limit the broad scope of the present disclosure and its potential applications.

One exemplary network in which embodiments of the present disclosure can be implemented may be viewed as a collection of data centers. Another exemplary network in which embodiments of the present disclosure can be implemented may be viewed as a collection of virtual private networks. In each of these settings, a "data center" (DC) or a virtual private network ("VPN") typically refers to a set of network elements, such as e.g. routers, switches, and controllers, as well as hosts connected thereto, that may communicate with one another by routing packets using a common instance of a routing protocol and by referring to certain common metrics to define a routing domain governed by the particular instance of the routing protocol. Typically, the network elements of a DC/VPN are under a single technical administration. Segregation into different DC's/VPNs allows defining administrative authorities and routing policies of different entities, e.g. of different organizations or different parts of a single organization.

Figure 1:
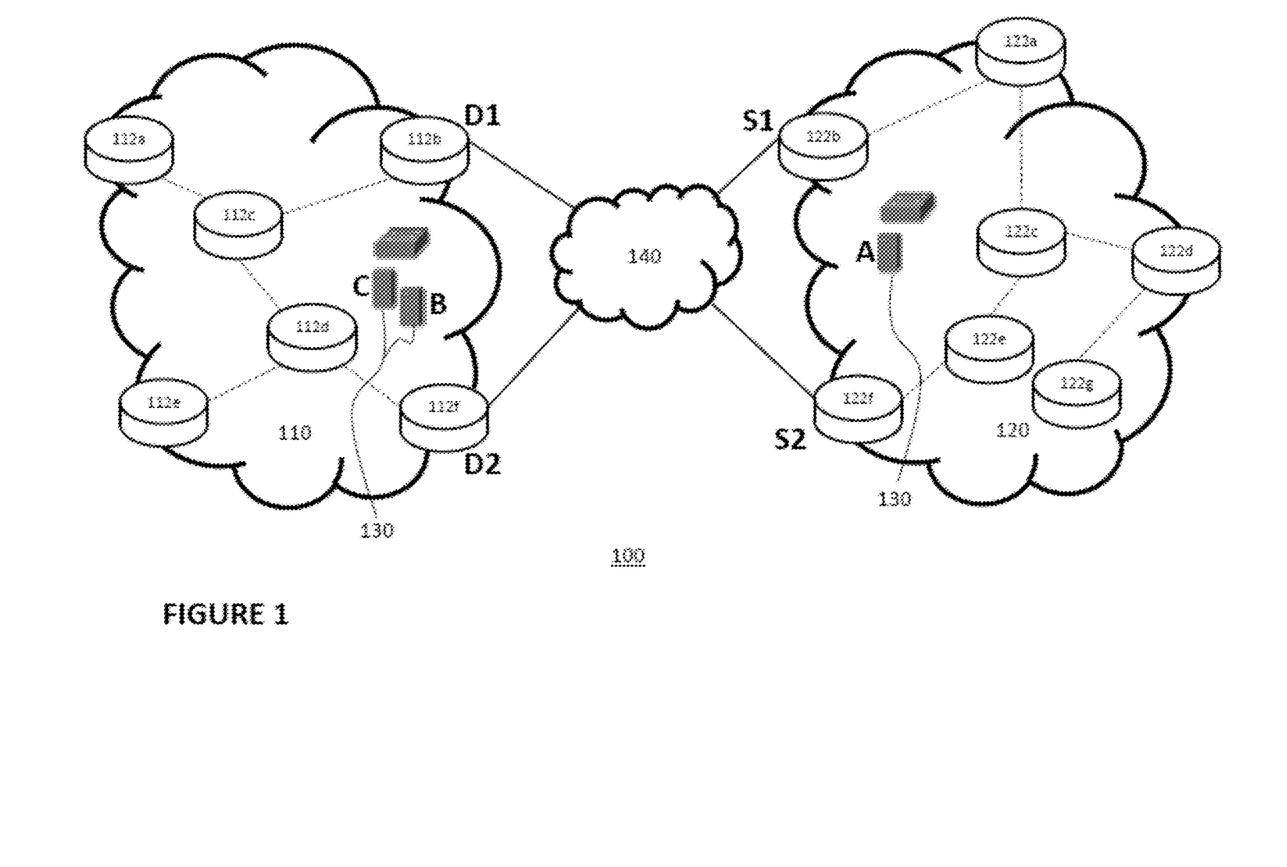
FIG. 1 is a schematic diagram illustrating a network according to some embodiments of the present disclosure.

FIG. 1 is a simplified schematic diagram illustrating a network 100 comprising multiple DCs, according to some embodiments of the present disclosure. While not illustrated in the figures, the same description provided for FIG. 1 with reference to DCs is applicable to an analogous architecture where, instead of DCs, VPNs are used. Since the description in context of VPNs would be analogous to that in context of DCs provided below, in the interests of brevity, this description is not repeated here.

In the example of FIG. 1, two DC's are illustrated as a first DC 110 and a second DC 120. The first DC 110 includes routers 112a-112f, each of which may be operatively coupled to at least one other network element within the first DC 110 as shown with solid lines between some of the routers 112a-112f. The lines between some of the routers 112a-112f may be viewed to represent exchange of packets according to one or more routing protocols of the first DC 110.

Similarly, the second DC 120 includes routers 122a-122g, each of which may be operatively coupled to at least one other network element within the second DC 120 as shown with solid lines between some of the routers 122a-122g. The solid lines between some of the routers 122a-122g may be viewed to represent exchange of packets according to one or more routing protocols of the second DC 120.

Routers in one DC that are configured to communicate with routers in other DC's are referred to as "edge routers", while routers in one DC that are only configured to communicate with other routes in the same DC are referred to as "core routers." In the illustration of FIG. 1, routers 112a, 112b, 112e, and 112f are edge routers, while routes 112c and 112d are core routers of the first DC 110, while, for the second DC 120, routers 122a, 122b, 122d, and 122f are edge routers and routes 122c, 122e, and 122g are core routers.

Each of the edge routers is configured to communicate, via e.g. external protocol 140 such as e.g. eBGP, with one or more edge routers in another DC. As an illustrative example, the edge routers may be service nodes (e.g. L3VPN, Layer 2 Virtual Private Network (L2VPN) endpoints) that exchange service state via BGP and Label Distribution Protocol (LDP).

In various implementations of embodiments of the present disclosure, a DC may be considered as a physical leaf/spine underlay distributed fabric on which a logical network of hosts is provided as an overlay network. In such implementations, "leaf nodes" may be analogous to what is illustrated in FIG. 1 as edge routers, and "spine nodes" may be analogous to what is illustrated in FIG. 1 as core routers.

Each leaf node in the topology may be a leaf switch that houses one or more network elements, such as e.g. physical servers. Though not illustrated in FIG. 1, a physical server associated with a leaf switch of each leaf node may be housed in a rack unit or "rack." Additional physical servers may also be housed in the rack. Leaf nodes are responsible for managing communications (e.g., routing and forwarding) originating from and destined for physical servers (and virtual machines and virtual switches hosted by the physical servers) in the rack. Hence, a term "top-of-rack" (ToR) is sometimes ascribed to leaf nodes. Each leaf node may act as a gateway from a Layer 2 network of a DC (e.g. Ethernet) onto the fabric 140 which operates at Layer 3. Therefore, sometimes leaf nodes are also described as "first hop routers," and, in the following, the terms first hop router, edge router, leaf node, and ToR switch may be used interchangeably.

It is appreciated that any number of leaf switches and spine switches may be present in a DC. Furthermore, while a physical leaf/spine topology with tenant overlay networks is used as an example, any network architecture with a physical underlay network and physical and/or logical overlay networks would be consistent with techniques presented herein. In addition, discussions herein are applicable to any IP fabric and presence of the spine nodes is entirely optional. For example, without spine nodes, the leaf nodes could be connected through a full mesh topology.

One or more hosts may be connected to the leaf and/or spine nodes of a DC, shown in FIG. 1 as hosts 130, in particular as hosts B and C in the first DC 110 and host A in the second DC 120, although it is appreciated that any number of hosts may be present in (i.e. connected to) a DC. In various embodiments, a "host" may be or comprise, by way of non-limiting example, any device providing storage, network, or/and computing resource in a data center. Examples of hosts include, but are not limited to, a computer, workstation, server, mainframe, virtual machine (whether emulated or on a "bare-metal" hypervisor), container, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In some embodiments, hosts 130 may include virtual switches and virtual machines ("VMs") that may be created and run on a physical server connected to each leaf node on top of a hypervisor (not shown in the figures). The virtual switches may be configured to manage communications of VMs in particular virtual networks and/or subnetworks ("subnets") and may be embodied by software stored and executed on the corresponding physical server connected to a leaf node, thus performing functions of a physical switch device. Similarly, the VMs may be software stored and executed on the corresponding physical servers connected to the leaf nodes and configured to exchange communications with other VMs. However, embodiments of the present disclosure are not limited to VM hosts and virtual switches. For example, in other typical embodiments, the hosts may include containers and bare-metal workload hosts (i.e. workloads that are not running a VM) that preserve their IP address as the application moves the workloads (example include clustered applications such as oracle RAC, etc.).

The aspects of the embodiments described herein can apply equally to both L2 and L3 DCI interworking, as well as, to both VXLAN and MPLS overlay encapsulation in the DC or WAN. Not only the architecture illustrated in FIG. 1 and described above applies to both DC and VPN use scenarios, but it is also applicable to both L2 (VXLAN) and L3 (LISP) overlay networks described above. In context of VXLAN, devices shown in FIG. 1, such as e.g. D1, D2, S1, and S2, are VTEPs, while, in context of LISP, these devices are xTRs. The architecture illustrated in FIG. 1 further includes a plurality of variously interconnected network elements, e.g. routers, representing an underlay network (not shown in FIG. 1).

Logic for Implementing Functionality of the Present Disclosure

Figure 2:
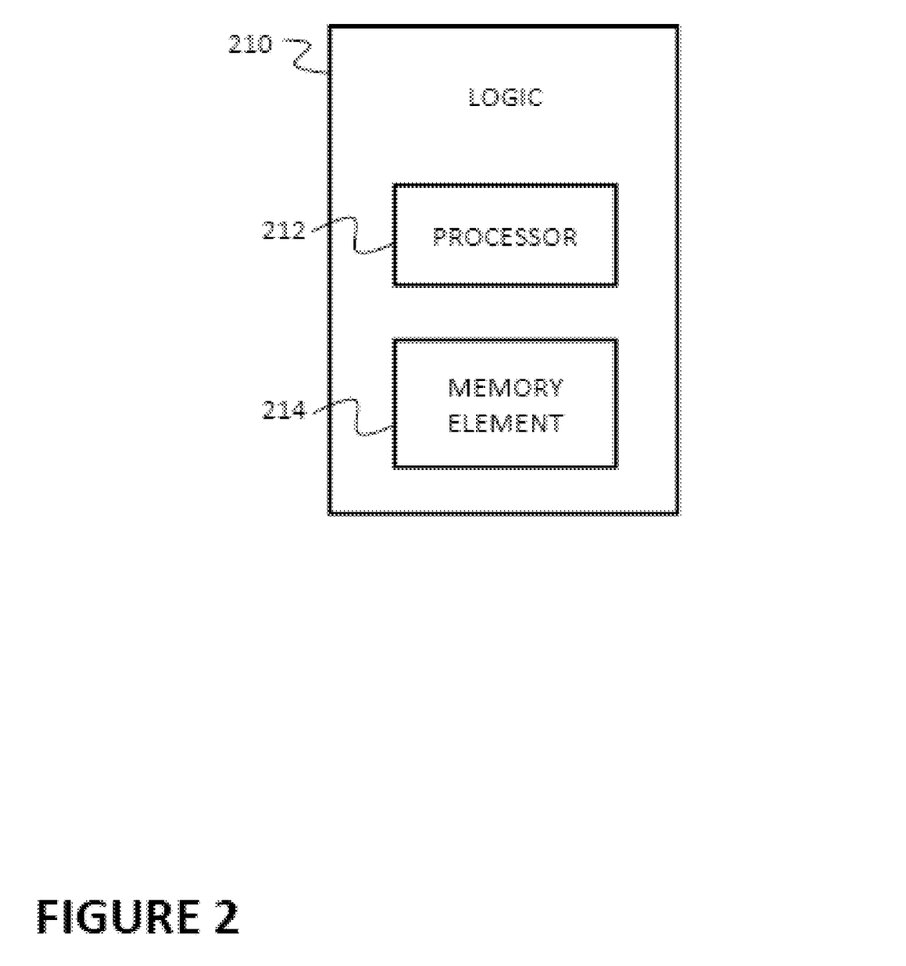
FIG. 2 is a schematic diagram illustrating a functional view of a network element according to some embodiments of the present disclosure.

FIG. 2 is a simplified schematic diagram illustrating a logic 210, according to some embodiments of the present disclosure. As shown, the logic 210 may include at least one processor 212 and at least one memory element 214, along with any other suitable hardware to enable its intended functionality of a network element described herein, e.g. the logic 210 may be configured to implement functionality of the control plane stitching described herein. Various repositories may be associated with the logic 210 (not shown in FIG. 2).

Even though the logic 210 is not illustrated in the network illustrated in FIG. 1, the logic 210 may be implemented as or in a network element, e.g. a control plane network element, or distributed over a number of network elements of the network 100. In some embodiments, the logic 210 may be included within at least some leaf nodes (i.e. first hop routers) of each DC/VPN, e.g. within the leaf nodes D1, D2, S1, and S2. In some embodiments, the logic 210 may be included within the network 140.

In various embodiments, elements of FIGS. 1 and 2 may be coupled to one another through one or more interfaces employing any suitable connections (wired or wireless), which provide viable pathways for network communications. Additionally, one or more of these elements of FIGS. 1 and 2 may be combined, divided, or removed from the architecture based on particular configuration needs. Network environment 100 and logic 210 may include a configuration capable of transmission control protocol/internet protocol (TCP/IP) communications for the transmission and/or reception of packets in the network. Network environment 100 and logic 210 may also operate in conjunction with a user datagram protocol/IP (UDP/IP), any other suitable protocol, or any suitable combination thereof where appropriate and based on particular needs.

Furthermore, in various embodiments, various functionalities described herein may be offloaded to external devices, not specifically described herein.

Figure 3A:
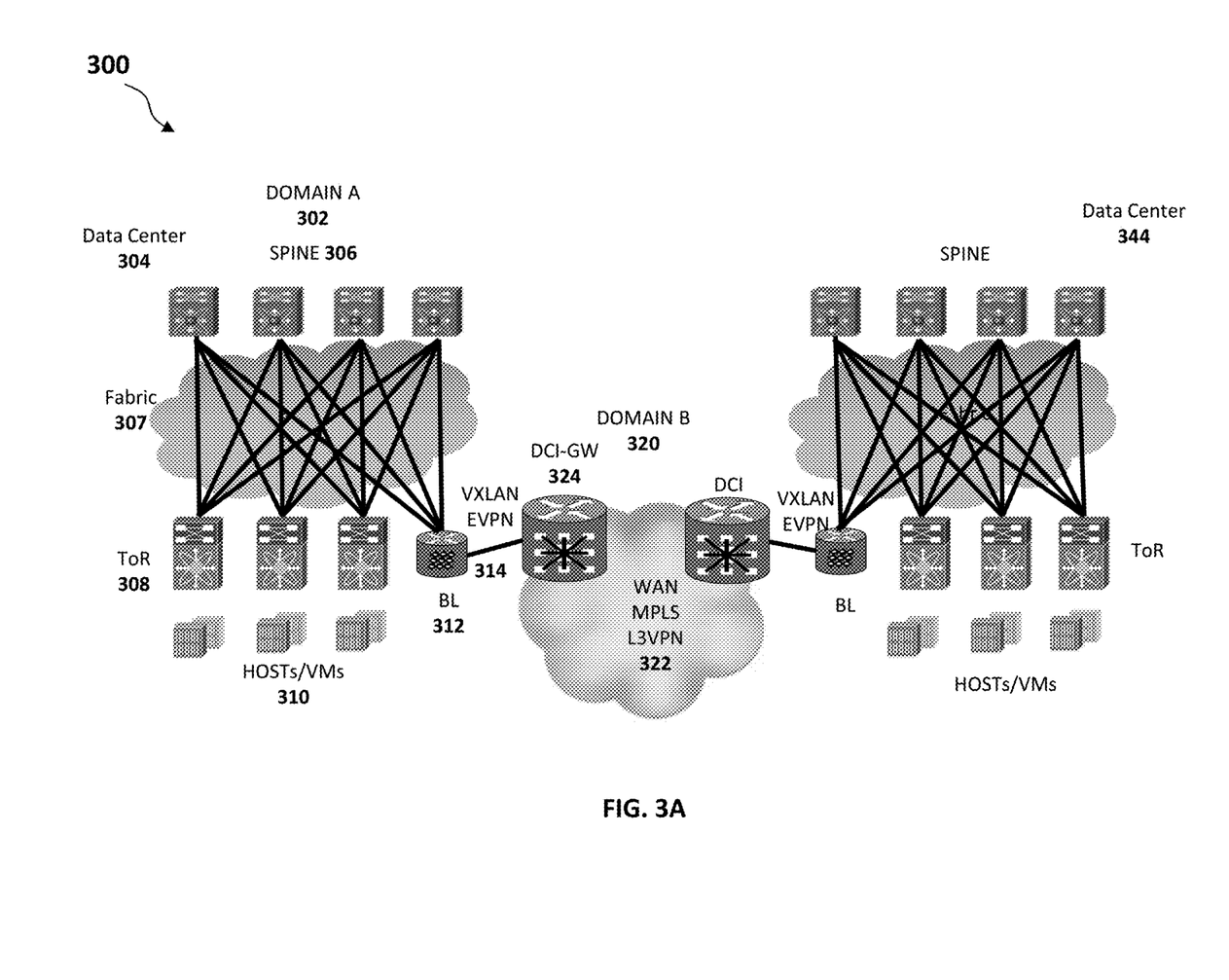
FIG. 3A is a schematic diagram of an embodiment of a data center interconnect between two domains in accordance with embodiments of the present disclosure.
Figure 3B:
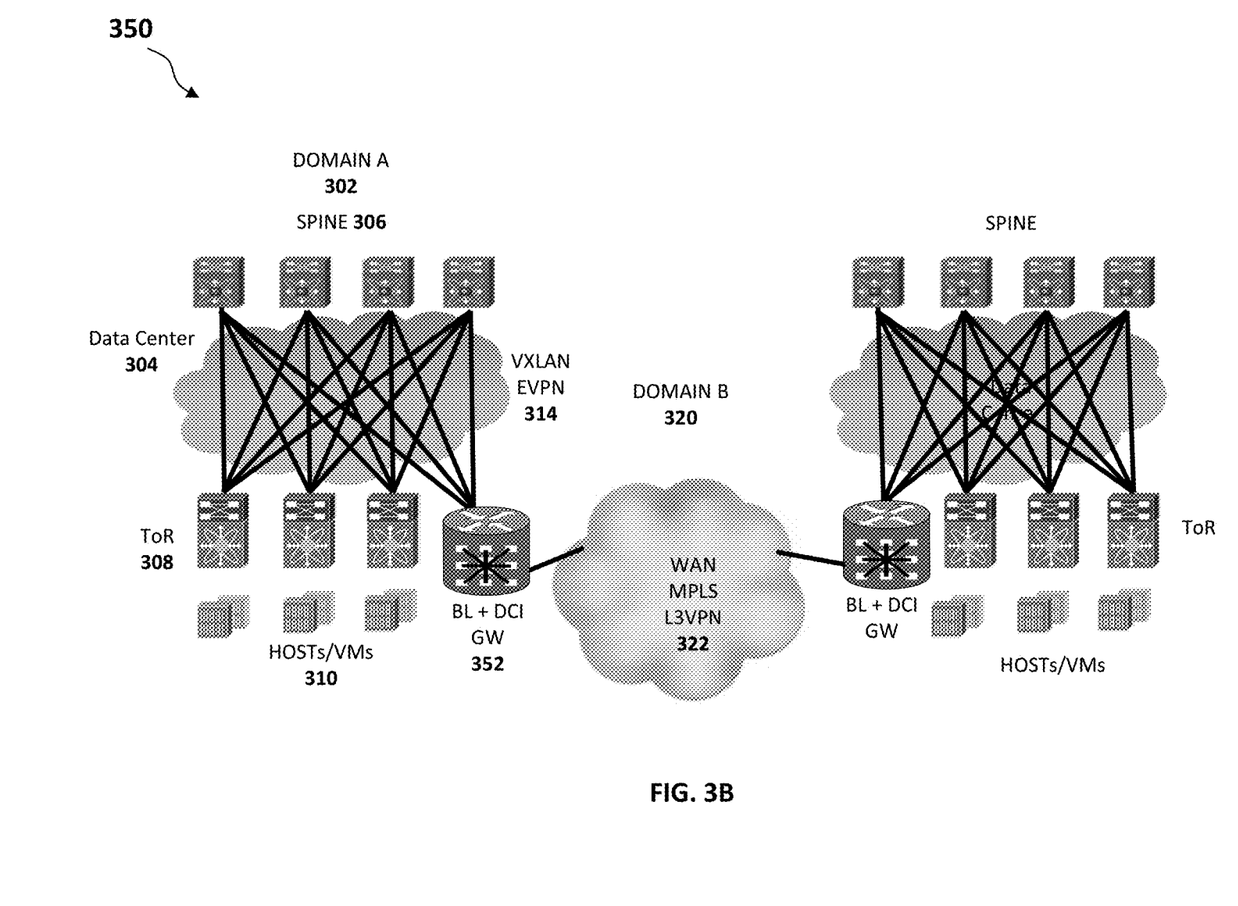
FIG. 3B is a schematic diagram of an another embodiment a data center interconnect between two domains in accordance with embodiments of the present disclosure.

Terminology:

FIG. 3A is a schematic diagram of an embodiment of a data center interconnect between two domains in accordance with embodiments of the present disclosure. FIG. 3B is a schematic diagram of an another embodiment a data center interconnect between two domains in accordance with embodiments of the present disclosure.

Domain: The term "domain" in this disclosure is used to identify network segments that require control plane separation. For example, in the context of a DCI application, a data center overlay control plane would be identified as one domain while an L2VPN or L3VPN control plane used to provide a data center interconnect would be another domain. Different control plane domains may or may not be the same administrative domains, and may or may not be the same BGP address family.

In FIG. 3A, a first domain, Domain A 302, can represent a data center overlay control plane. Domain B 320 can represent a WAN control plane used to provide a data center interconnect between a first data center 304 and a second datacenter 344.

A datacenter interconnect gateway 324 can reside at the interface between the first domain and the second domain. DCI-GW: A stitching gateway (GW), that is common across two or more "domains" and stitches the control planes across these multiple domains. In the context of DCI application, a DCI GW stitches a DC EVPN overlay control plane to L2VPN/L3VPN control plane to enable DCI service for DC tenants. In embodiments, a DCI-GW, such as DCI-GW 324, can be implemented on a DCI-GW router.

Returning to FIG. 3A, system 300 includes a first data center 304 and a second data center 344. The first data center 304 is connected to the second data center 344 by a network, such as a wide area network (WAN) 322. WAN 322 can implement L2/L3VPN control plane to enable DCI services for datacenter tenants (via DCI-GW 324).

The datacenter 304 can include spine switches 306, a fabric interconnect 307, and top-of-rack switches 308. ToR switches 308 can be connected to host servers 310 that provide VM functionality. Additionally, the datacenter 302 can include border leaf switches 312 that can interface with DCI-GW 314. As shown in the system 350 of FIG. 3B, the BL and DCI-GW can be integrated into a single network element 352.

Stitching Solution:

Domain Separation:

At the outset, each network domain that requires control plane separation and needs to be stitched with other domains can be identified. In the DCI context, a set of top-of-rack switches (ToRs) 308 and a DCI-GW 324 participating in DC overlay control plane would form one domain, say domain-A 302, while a set of Provider Edges (including the DCI-GW) participating in L3VPN/L2VPN control plane for DCI would form another domain, say domain-B, 320.

Multiple Sets of Route Targets (RTs), One Set Per-Domain:

A set of Route Targets (RTs) can define a list of Import and Export Route Targets specific to a single domain, that is tagged with a unique name (in this example, the name of a color). A DCI-GW router 324 can implement one or more bridge domains (BD) for L2 forwarding and implements one or more Virtual Route Forwarder (VRF) for L3 forwarding. Normally, a single list of Import/Export RTs is defined per-BD and per-VRF. Described herein is for a DCI-GW interconnecting multiple domains to specify multiple sets of RTs, one set for each Domain. Each per-domain RT set is identified by a unique color. Per-domain RT sets are specified per bridge domain for stitching L2 domains and per-VRF for stitching L3 domains. For example, the DC domain identified as Domain-A (data-center side) 302 above would define a VRF-RT set BLUE and a BD-RT set BLUE, while the DCI domain identified as domain-B 320 would use a VRF-RT set GREEN and a BD-RT set GREEN.

Route Re-Origination Across Domains Via RT-Color Based Import and Advertisement Rules:

A DCI-GW router 324 that interconnects two domains, say Domain A 302 and Domain B 320, would define two sets of Route Targets: RT set BLUE for Domain A 302 and RT set GREEN for Domain B 320. Each RT set will have one or more Import RTs and one or more Export RTs. The DCI-GW router would receive routes from Domain A peers with RTs matching import RTs in Set BLUE, and while advertising to Domain B peers, would replace RTs in the route with Set GREEN export RTs. Similarly, it would receive routes from Domain B peers with RTs matching import RTs in Set GREEN, and while advertising to Domain A peers, would replace RTs in the route with Set BLUE export RTs.

RT mapping between different domains (for example, via policy) as disclosed herein offers advantages, in addition to advantages readily apparent to those of skill in the art:

A) enables domain scoped RT namespace;

B) enables stitching across different address families;

C) it is much simpler to setup cross-domain stitching as opposed to trying to do this via policy;

D) allows us the flexibility to choose between the two sets while applying per neighbor per VRF rules during import, export and update generation of VPN/EVPN routes. This is more efficient than having separate neighbor inbound, outbound and VRF import and export route-policy to achieve similar mapping.

Figure 4:
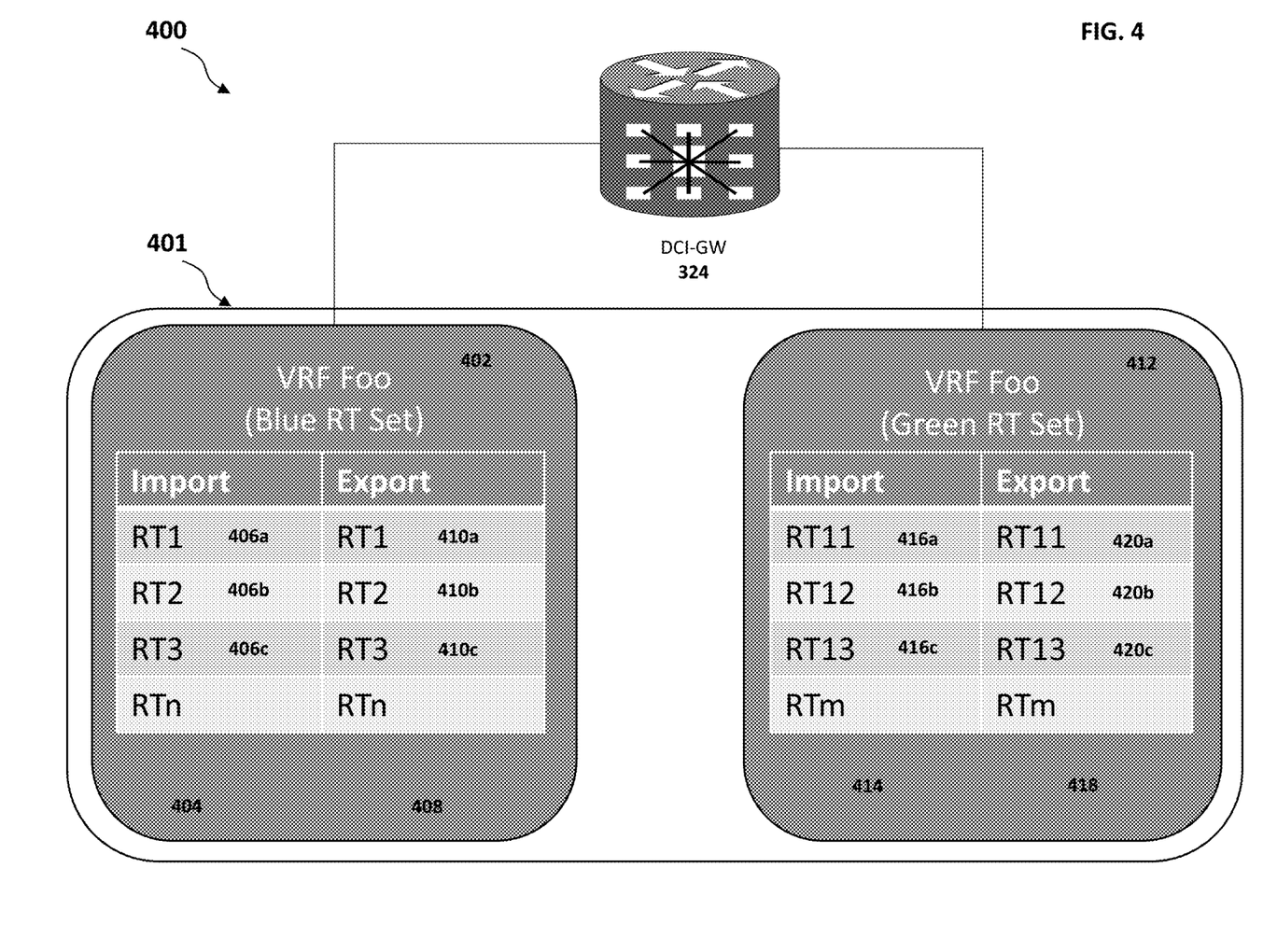
FIG. 4 is a schematic diagram of a data center interconnect network element configured with a border gateway protocol virtual routing and forwarding table in accordance with embodiments of the present disclosure.

FIG. 4 is a schematic diagram of a data center interconnect network element configured with a border gateway protocol virtual routing and forwarding table in accordance with embodiments of the present disclosure. FIG. 4 illustrates a DCI-GW 324 in accordance with embodiments of the present disclosure. The DCI-GW 324 can include a Blue RT set VRF mapping 402 and a Green RT set VRF mapping 412. The terms "blue" and "green" are used to distinguish between import RTs (blue) from export RTs (green).

The Blue RT set VRF foo 402 can include a listing of import RTs and a listing of export RTs. For example, import list 404 can include RT1 406a, RT2 406b, and RT3 406c through RTn; export list 408 can include RT1 410a, RT2 410b, and RT3 410c through RTn. The Green RT set VRF foo 412 can include a listing of import RTs and a listing of export RTs. For example, import list 414 can include RT1 416a, RT2 416b, and RT3 416c through RTm; export list 418 can include RT1 420a, RT2 420b, and RT3 420c through RTm.

Figure 5A:
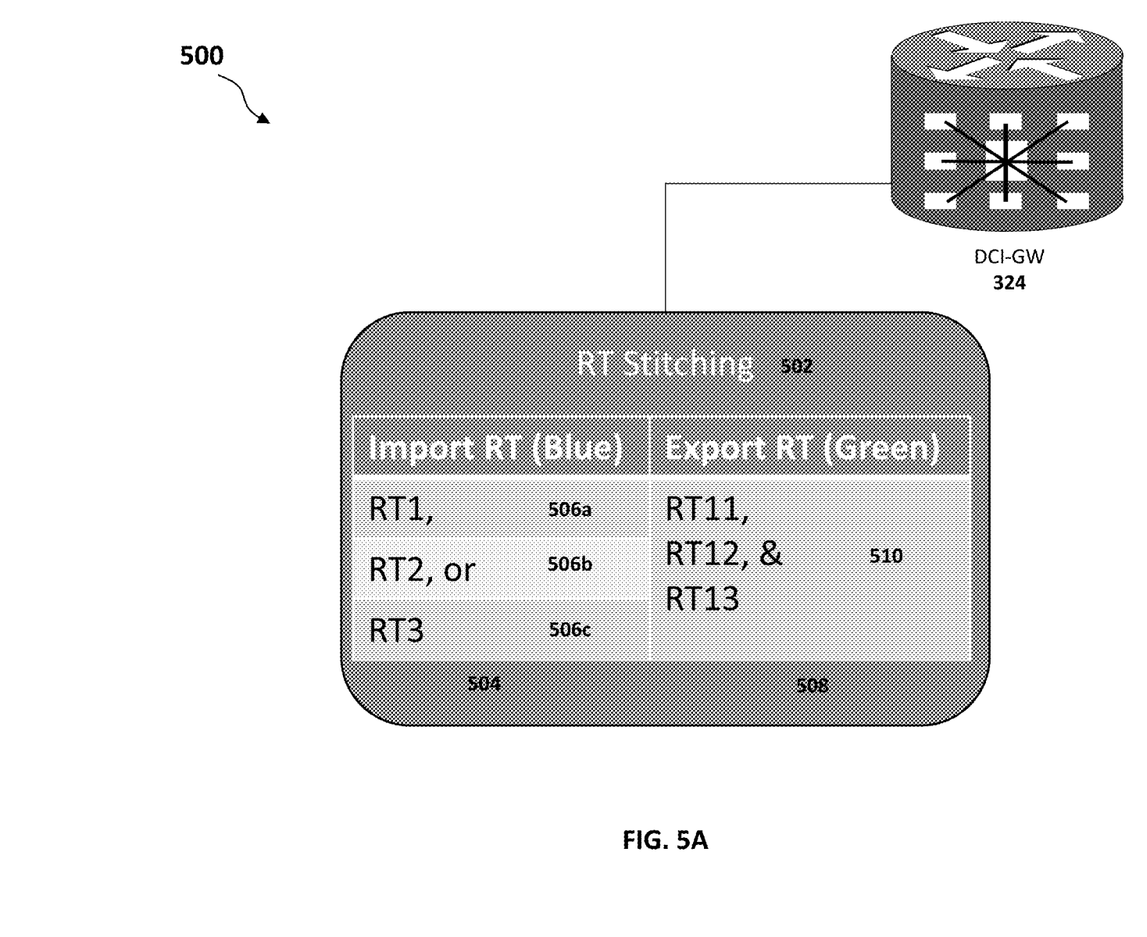
FIG. 5A is a schematic diagram of a data center interconnect with a configured border gateway protocol route target stitching table for virtual routing and forwarding from a first domain to a second domain in accordance with embodiments of the present disclosure.

FIG. 5A is a schematic diagram of a data center interconnect with a configured border gateway protocol route target stitching table 502 for virtual routing and forwarding from a first domain to a second domain in accordance with embodiments of the present disclosure. The DCI-GW 324 can import any one of the RTs from the Blue import set 504 (including e.g., RT1 506a, RT2 506b, or RT3 506c). If any one of these example Blue RTs is imported into the DCI-GW 324 from a first domain, the DCI-GW 324 can copy all of the Green export RTs 510 from the green export RT set 508 into the reorigination prefix for communicating with a second domain.

Figure 5B:
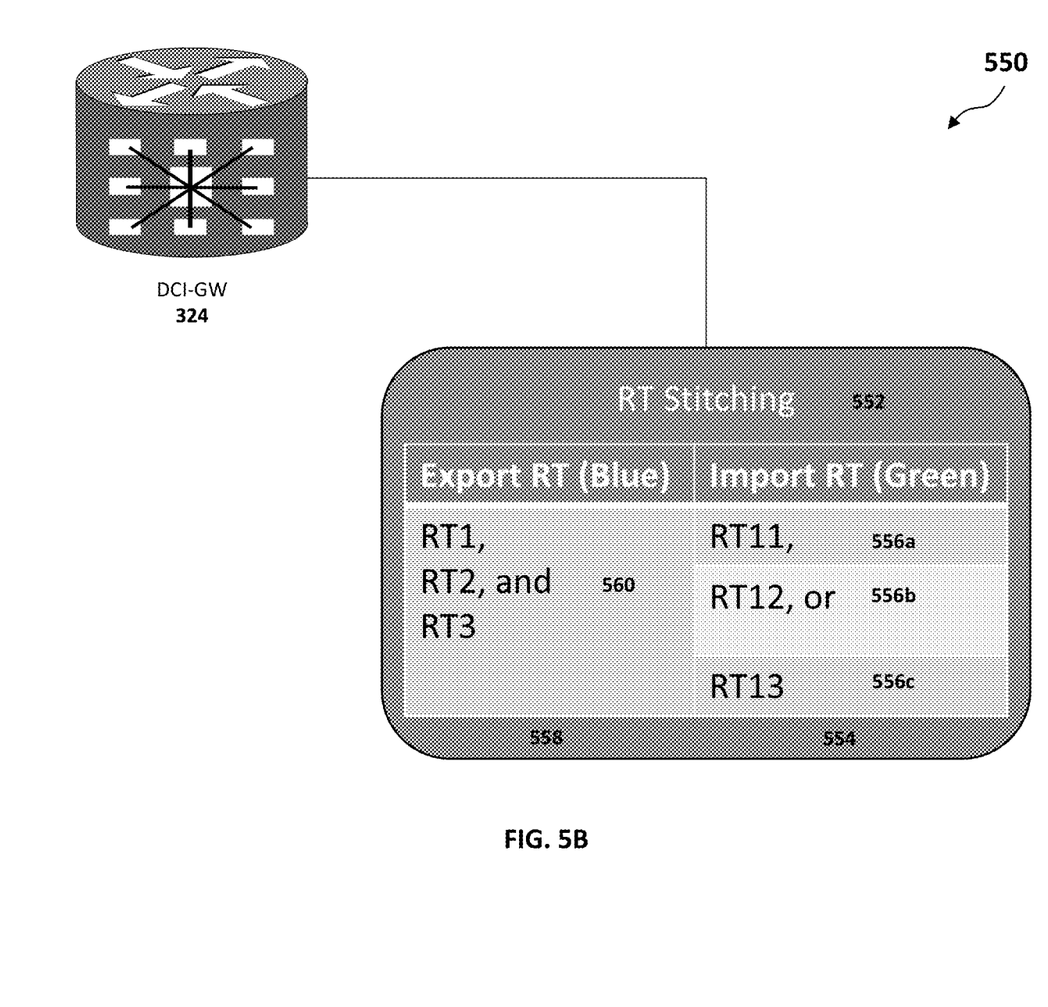
FIG. 5B is a schematic diagram of a data center interconnect with a configured border gateway protocol route target stitching table for virtual routing and forwarding from a second domain to a first domain in accordance with embodiments of the present disclosure.

FIG. 5B is a schematic diagram of a data center interconnect with a configured border gateway protocol route target stitching table for virtual routing and forwarding from a second domain to a first domain in accordance with embodiments of the present disclosure. The DCI-GW 324 can import any one of the RTs 554 from the Green RT set 508 (including e.g., RT1 556a, RT2 556b, or RT3 506c). If any one of these example Green RTs is imported into the DCI-GW 324 from a second domain, the DCI-GW 324 can copy all of the Green export RTs 560 from the Green export RT set 508 into the reorigination prefix for communicating with a first domain.

Figure 6A:
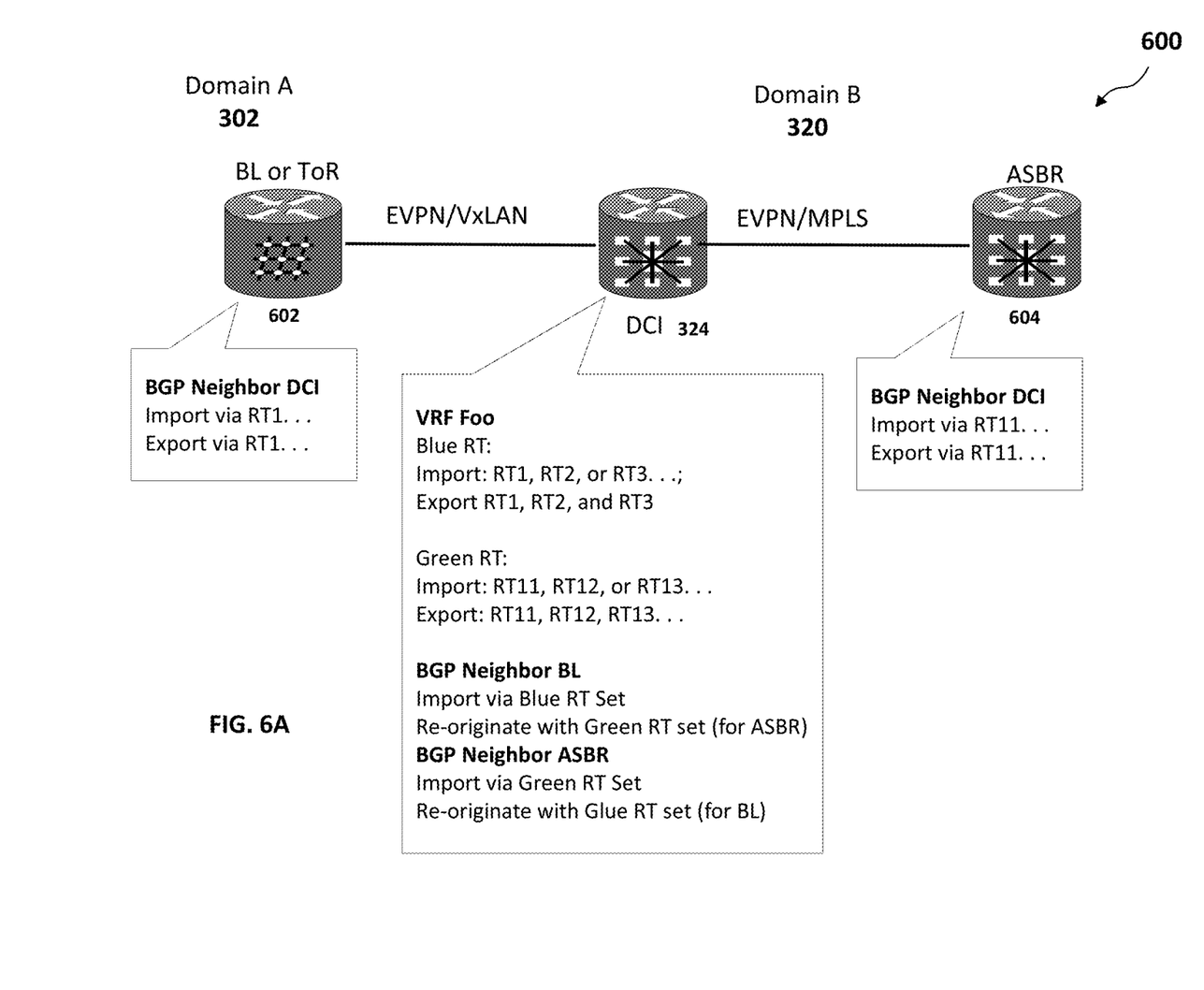
FIG. 6A is a schematic diagram of an example communication pathway between a network element of a first domain and a network element of a second domain via a data center interconnect in accordance with embodiments of the present disclosure.

FIG. 6A is a schematic diagram of an example communication pathway between a network element of a first domain and a network element of a second domain via a data center interconnect in accordance with embodiments of the present disclosure. In FIG. 6A, the system 600 includes a first domain 302 that includes a first domain network element 602. First domain network element 602 can be a border leaf, top-of-rack (TOR) switch, or other edge network element. The first domain 302 can be an L2 VPN domain in this example that is part of a fabric switched architecture. The system 600 also includes a second domain 320 that includes a second domain network element 604. Second domain network element 602 can be, for example, an autonomous system boundary router. The second domain 320 can be an L3VPN, WAN, MPLS, or other domain. The system 602 can include a DCI GW 324 that servers as an interface between the first domain 302 and the second domain 320.

In this example, the first domain network element 602 can import from and export to the DCI GW 324 VRF routing table via RT1. The second domain network element 604 can import from and export to the DCI GW 324 VRF routing table via RT11 in this example. The DCI GW 324 can include a VRF (as shown in FIGS. 4 and 5A-5B) that includes VRF Foo that identifies domain-specific RT sets for routing transmissions between the first domain 302 and the second domain 320. For example, the DCI GW 324 can receive a BGP routing transmission that includes a prefix p1 that identifies RT1 from the first domain network element 602. The DCI GW 324 can determine that RT1 is part of a first RT set (Blue RT set). The DCI GW 324 can reoriginate the BGP routing using one or more RTs from a second RT set (here, the Green RT set) for the second domain network element 604.

Figure 6B:
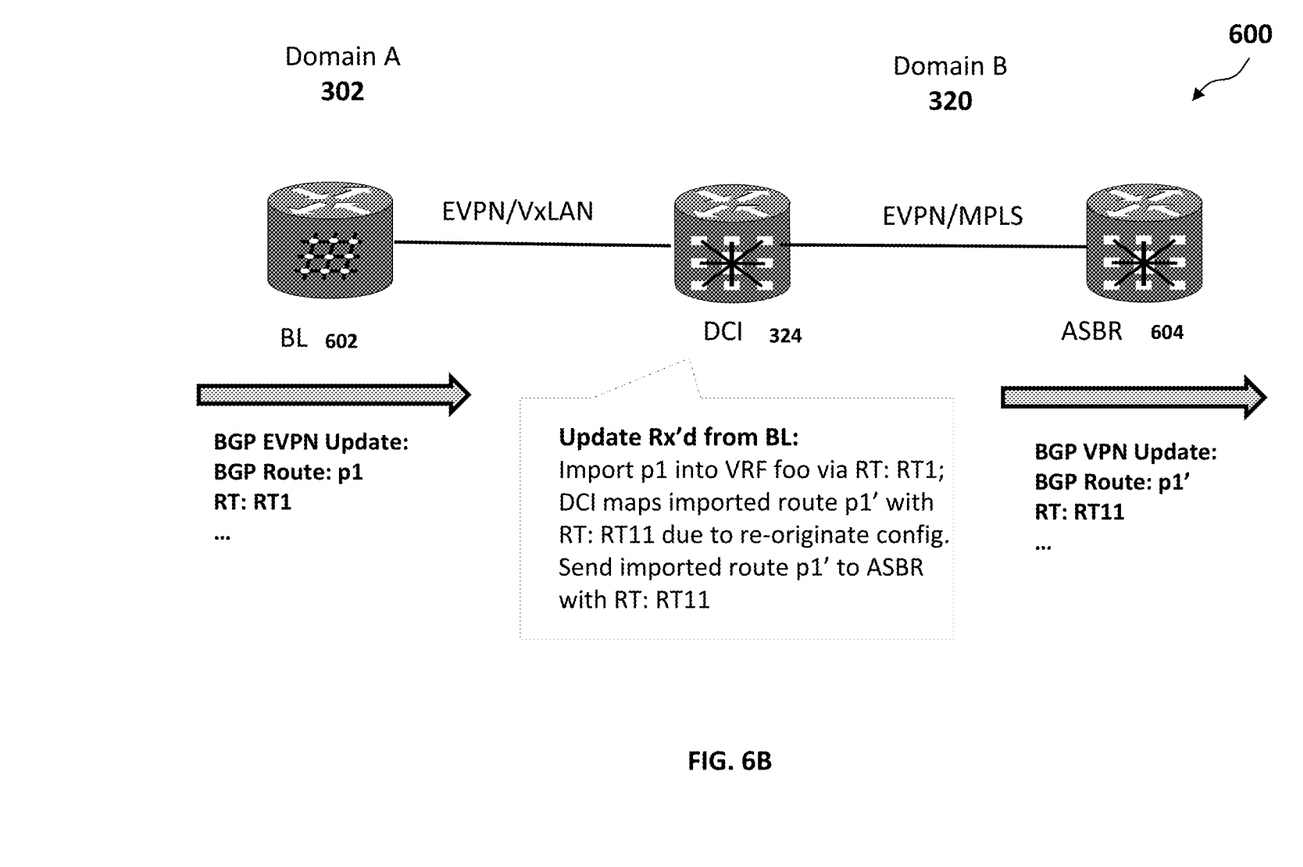
FIG. 6B is a schematic diagram illustrating an example update from a first domain to a second domain in accordance with embodiments of the present disclosure.

FIG. 6B is a schematic diagram illustrating an example update from a first domain to a second domain in accordance with embodiments of the present disclosure. Continuing the example from FIG. 6A, the system 600 includes the DCI GW 324 that has a VRF foo, wherein each RT set includes one RT, for simplification purposes. The first (Blue) RT set includes RT1 and the second (Green) RT set includes RT11. The DCI GW 324, therefore, would import from BGP Neighbor BL 602 via the first (Blue) RT set, which only includes RT1 in this example; and the DCI GW 324 would re-originate the BGP routing table and export to the second domain ASBR 604 via the second (Green) RT set, which only includes RT11 in this example. The DCI GW 324, therefore, would import from BGP Neighbor ASBR 604 via the second (Green) RT set, which only includes RT11 in this example; and the DCI GW 324 would re-originate the BGP routing table and export to the first domain BL 602 via the first (Blue) RT set, which only includes RT1 in this example.

In the example in FIG. 6B, the DCI GW 324 can receive a BGP EVPN update from the first domain network element (e.g., border leaf or TOR) 602. The BGP EVPN update can include a BGP route prefix p1. The prefix p1 can identify a route target RT1. The DCI GW 324 can receive the update from the first domain network element 602. The DCI GW 324 can import the prefix p1 into the VRF foo via RT1. The DCI GW 324 can create a copy of the BGP route prefix p1, hereinafter referred to as an imported route p1', based on the re-origination configuration that is part of the VRF in DCI GW 324. The imported route p1' can include RT11 (or, more generally, the RT from Green RT set). The DCI GW 324 can send the BGP VPN update with the imported route p1' to the second domain network element 604, the imported route p1' identifying route target RT11.

Figure 6C:
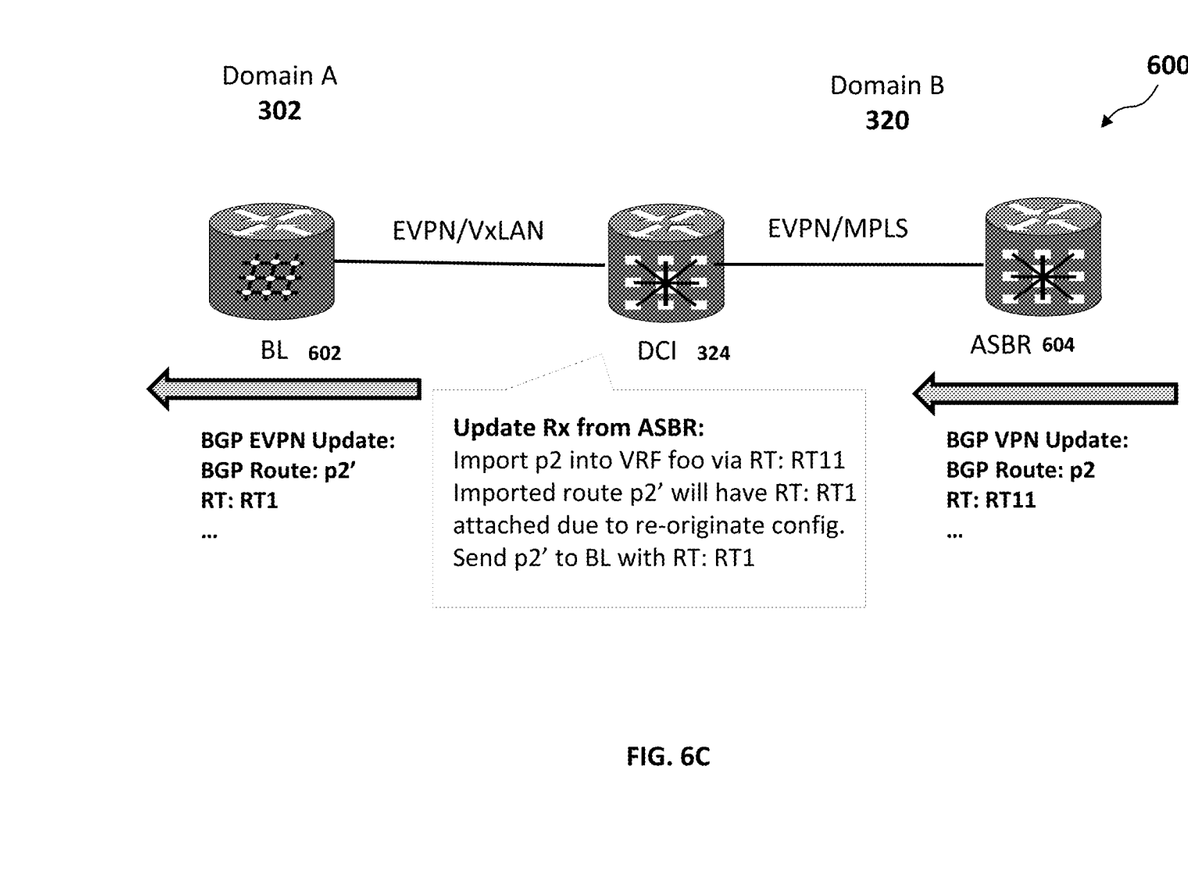
FIG. 6C is a schematic diagram illustrating an example update from a second domain to a first domain in accordance with embodiments of the present disclosure.

FIG. 6C is a schematic diagram illustrating an example update from a second domain to a first domain in accordance with embodiments of the present disclosure. In the example in FIG. 6C, the DCI GW 324 can receive a BGP EVPN update from the second domain network element (e.g., ASBR) 604. The BGP EVPN update can include a BGP route prefix p2. The prefix p2 can identify a route target RT11. The DCI GW 324 can receive the update from the first domain network element 604. The DCI GW 324 can import the prefix p2 into the VRF foo via RT11. The DCI GW 324 can create a copy of the BGP route prefix p2, hereinafter referred to as an imported route p2', based on the reorigination configuration that is part of the VRF in DCI GW 324. The imported route p2' can include RT1 (or, more generally, the RT from Blue RT set). The DCI GW 324 can send the BGP VPN update with the imported route p2' to the first domain network element 602, the imported route p2' identifying route target RT1.

Figure 7:
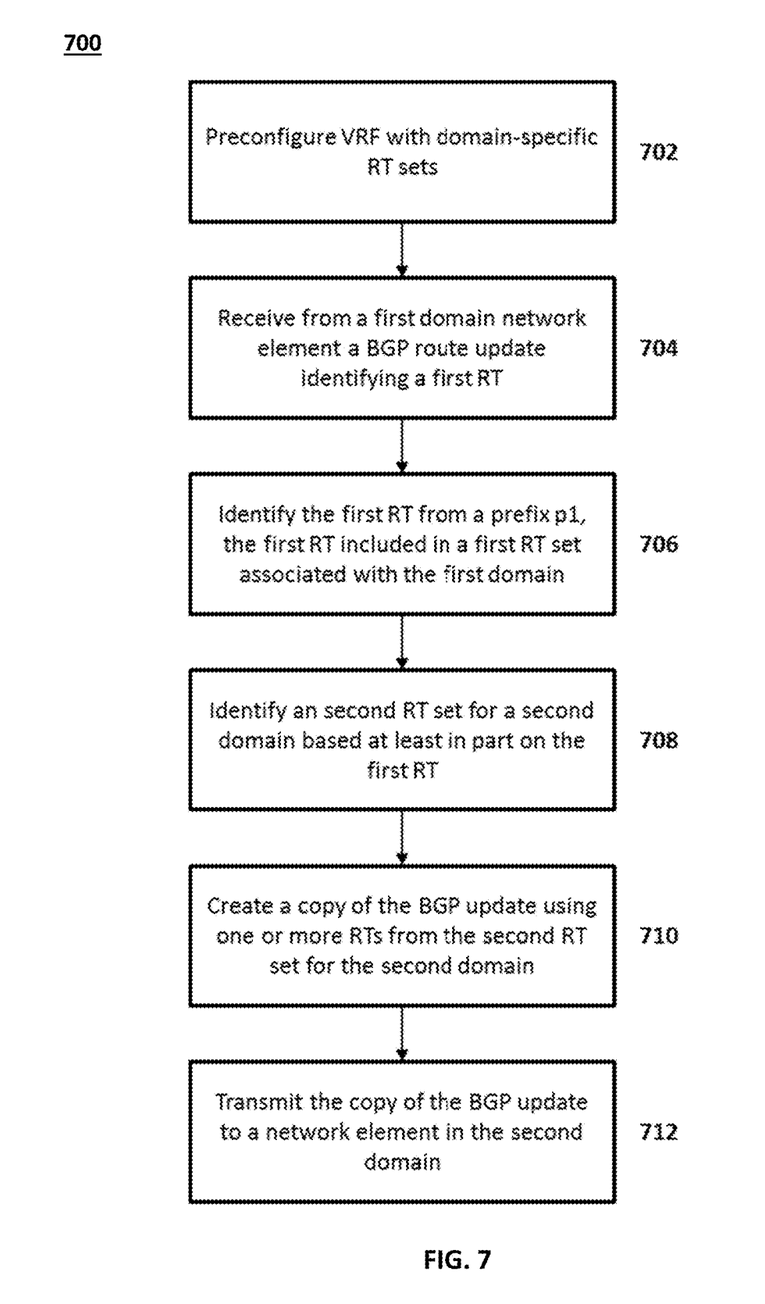
FIG. 7 is a process flow diagram for data center interconnect stitching between domains in accordance with embodiments of the present disclosure.

FIG. 7 is a process flow diagram 700 for data center interconnect stitching between domains in accordance with embodiments of the present disclosure. A datacenter interconnect (DCI) network element, such as a DCI gateway, can be preconfigured with virtual routing and forwarding (VRF) route target sets for a plurality of disparate virtual private networking (VPN) domains (702). The DCI GW can receive, from a first network element in a first domain a BGP route update, the BGP route update including a prefix that identifies a first route target (first RT) (704). The DCI GW can identify the first RT from the prefix as being included in a first RT set associated with the first domain (706). The DCI GW can identify one or more RTs from a second RT set associated with a second domain based, at least in part, on the first RT (708). The DCI GW can copy the BGP route update to create a new BGP route update that includes the one or more RTs from the second RT set associated with the second domain (710). The DCI GW can transmit the BGP route update to a second network element in the second domain (712).

Aspects of the embodiments include one or more advantages. Among the advantages include each domain being able to be administered by different entities without having to coordinate the RT name space. One of the network domains can be a legacy network, which may not want to change the existing RT name space. Configuration within a Data Center domain may be automatically generated using scripts using random values with its own RT name space that may/will not match with the RT name space used on the L2VPN/L3VPN domain.

Advantages also include providing greater flexibility in designing networks. Keeping the RT name space separate will reduce chances of wrongly importing due to misconfiguration and easy to catch such configuration errors, since the RT name space of the different domains can be disjoint. Other advantages can be readily apparent to those of skill in the art.

What is claimed is:

1. A method comprising:
    storing a route stitching table at a datacenter interconnect network element, wherein the datacenter interconnect network element provides for routing transmissions between at least a first domain and a second domain, the first domain and the second domain comprising different control planes, the route stitching table comprising one or more first route target values for a first route target set associated with the first domain and one or more second route target values for a second route target set associated the second domain, and the first route target set is associated with a first indicator tag and the second route target set is associated with a second indicator tag;
    receiving by the datacenter interconnect network element a routing update from a first network element the first domain, the routing update comprising a first routing prefix comprising a particular first route target value;
    determining, based on the route stitching table, that the particular first route target value is associated with the first route target set associated with the first domain;
    identifying, via the route stitching table, the second route target set associated with the second domain;
    creating a second routing prefix that includes the one or more second route target values from the second route target set; and
    transmitting the second routing prefix to a network element in the second domain.

2. The method of claim 1, wherein the routing update is received from one of a border leaf node or a top-of-rack (TOR) switch in the first domain.

3. The method of claim 1, wherein transmitting the second routing prefix comprises transmitting the second routing prefix to an autonomous system boundary router (ASBR) in the second domain.

4. The method of claim 1, wherein the first domain comprises a Layer 2 (L2) virtual private network.

5. The method of claim 1, wherein the second domain comprises a Layer 3 (L3) virtual private network.

6. The method of claim 1, wherein receiving the routing update further comprises receiving, from the first network element a border gateway protocol (BGP) routing update comprising the first routing prefix.

7. The method of claim 6, wherein creating the second routing prefix comprises:
    copying the BGP routing update; and
    mapping the one or more second route target values from the second route target set to the BGP routing update.

8. A datacenter interconnect (DCI) network element comprising:
    at least one memory element having instructions stored thereon;
    at least one processors coupled to the at least one memory element and configured to execute the instructions to cause the DCI network element to:
    store a route stitching table, wherein the DCI network element is to route transmissions between at least a first domain and a second domain, the first domain and the second domain comprising different control planes, the route stitching table comprising one or more first route target values for a first route target set associated with the first domain and one or more second route target values for a second route target set associated the second domain, and the first route target set is associated with a first indicator tag and the second route target set is associated with a second indicator tag;
    receive a routing update from a first network element of the first domain, the routing update comprising a first routing prefix comprising a particular first route target value;
    determine, based on the route stitching table, that the particular first route target value is associated with the first route target set, the first route target set associated with the first domain;
    identify, via the route stitching table, the second route target set associated with the second domain;
    create a second routing prefix that includes the one or more second route target values from the second route target set; and
    transmit the second routing prefix to a network element in the second domain.

9. The DCI network element of claim 8, wherein the routing update is received from one of a border leaf node or a top-of-rack (TOR) switch in the first domain.

10. The DCI network element of claim 8, wherein transmitting the second routing prefix comprises transmitting the second routing prefix to an autonomous system boundary router (ASBR) in the second domain.

11. The DCI network element of claim 8, wherein the first domain comprises a Layer 2 (L2) virtual private network.

12. The DCI network element of claim 8, wherein the second domain comprises a Layer 3 (L3) virtual private network.

13. The DCI network element of claim 8, wherein receiving the routing update further comprises receiving, from the first network element, a border gateway protocol (BGP) routing update comprising the first routing prefix.

14. The DCI network element of claim 13, wherein creating the second routing prefix comprises:
copying the BGP routing update; and
mapping the one or more second route target values from the second route target set to the BGP routing update.

15. A system comprising:
a first network element of a first virtual private networking (VPN) domain; and
a datacenter interconnect (DCI) network element comprising:
at least one memory element having instructions stored thereon;
at least one processors coupled to the at least one memory element and configured to execute the instructions to cause the DCI network element to:
store a route stitching table, wherein the DCI network element is to route transmissions between at least the first VPN domain and a second VPN domain, the first VPN domain and the second VPN domain comprising different control planes, the route stitching table comprising one or more first route target values for a first route target set associated with the first VPN domain and one or more second route target values for a second route target set associated the second VPN domain, and the first route target set is associated with a first indicator tag and the second route target set is associated with a second indicator tag;
receive a routing update from a first network element of the first VPN domain, the routing update comprising a first routing prefix comprising a particular first route target value;
determine, based on the route stitching table, that the particular first route target value is associated with the first route target set associated with the first VPN domain;
identify, via the route stitching table, the second route target set associated with the second VPN domain;
create a second routing prefix that includes the one or more second route target values from the second route target set; and
transmit the second routing prefix to a network element in the second VPN domain.

16. The system of claim 15, wherein the first network element comprises as autonomous system boundary router (ASBR), and wherein the routing update is received from the ASBR in the first VPN domain.

17. The system of claim 15, wherein the transmitting the second routing prefix comprises transmitting the second routing prefix to an autonomous system boundary router (ASBR) in the second VPN domain.

18. The system of claim 15, wherein the first VPN domain comprises a Layer 3 (L3) virtual private network.

19. The system of claim 15, wherein the second VPN domain comprises a Layer 2 (L2) virtual private network.

20. The system of claim 15, wherein receiving the routing update further comprises receiving, from the first network element a border gateway protocol (BGP) routing update comprising the first routing prefix.

21. The system of claim 20, wherein creating the second routing prefix comprises:
copying the BGP routing update; and
mapping the one or more second route target values from the second route target set to the BGP routing update.

* * * * *

UNITED STATES PATENT AND TRADEMARK OFFICE
CERTIFICATE OF CORRECTION

PATENT NO. : 10,554,549 B1  
APPLICATION NO. : 15/421268  
DATED : February 4, 2020  
INVENTOR(S) : Suresh Doddagaddavalli Basavarajappa et al.

Page 1 of 1

It is certified that error appears in the above-identified patent and that said Letters Patent is hereby corrected as shown below:

In the Claims

Claim 6, Column 10, Line 19, please replace "element a border" with --element, a border--

Claim 8, Column 10, Line 50, please replace "set, the first route target set associated" with --set associated--

Claim 20, Column 12, Line 29, please replace "element a border" with --element, a border--

Signed and Sealed this  
Seventeenth Day of March, 2020

Andrei Iancu  
*Director of the United States Patent and Trademark Office*